United States Patent
Landais

(10) Patent No.: US 10,477,419 B2
(45) Date of Patent: Nov. 12, 2019

(54) RESTORATION OF MOBILE TERMINATING CS SERVICES IN CASE OF FAILURE OF A CORE NETWORK ENTITY IN A MOBILE COMMUNICATION SYSTEM

(75) Inventor: Bruno Landais, Lannion (FR)

(73) Assignee: Alcatel Lucent, Nozay (FR)

(*) Notice: Subject to any disclaimer, the term of this patent is extended or adjusted under 35 U.S.C. 154(b) by 0 days.

(21) Appl. No.: 14/112,656

(22) PCT Filed: Apr. 18, 2012

(86) PCT No.: PCT/EP2012/057084
§ 371 (c)(1),
(2), (4) Date: Dec. 19, 2013

(87) PCT Pub. No.: WO2012/143397
PCT Pub. Date: Oct. 26, 2012

(65) Prior Publication Data
US 2014/0106742 A1   Apr. 17, 2014

(30) Foreign Application Priority Data
Apr. 19, 2011 (EP) .................................. 11290191

(51) Int. Cl.
*H04W 24/00* (2009.01)
*H04W 24/04* (2009.01)
(Continued)

(52) U.S. Cl.
CPC ............ *H04W 24/04* (2013.01); *H04W 68/00* (2013.01); *H04W 92/24* (2013.01)

(58) Field of Classification Search
CPC ...... H04W 24/00; H04W 24/08; H04W 88/08
See application file for complete search history.

(56) References Cited

U.S. PATENT DOCUMENTS

2009/0238143 A1   9/2009  Mukherjee et al.
2009/0327819 A1*  12/2009  Pan ..................... H04L 43/0823
                                                    714/49
(Continued)

FOREIGN PATENT DOCUMENTS

CN    101500212 A    8/2009
CN    101754357 A    6/2010
(Continued)

OTHER PUBLICATIONS

3GPP TS 23.007 V9.0.0 (Jun. 2009) 3rd Generation Partnership Project; Technical Specification Group Core Network; Restoration procedures (Release 9) (Year: 2009).*
(Continued)

*Primary Examiner* — Justin Y Lee
(74) *Attorney, Agent, or Firm* — Fay Sharpe LLP

(57) ABSTRACT

In an embodiment, a method for restoration of MT (Mobile Terminating) CS services in case of failure of a PS Core Network CN entity, referred to as original CN entity, originally identified as to be contacted for a paging request towards a User Equipment UE for said MT CS services, in a mobile communication system, comprises:

providing that an alternative CN entity is contacted instead of said original CN entity, and that said alternative CN entity is forced to accept said paging request even if said UE is unknown to said alternative CN entity.

17 Claims, 3 Drawing Sheets

MME restoration for CS services

(51) Int. Cl.
*H04W 68/00* (2009.01)
*H04W 92/24* (2009.01)

(56) References Cited

U.S. PATENT DOCUMENTS

| | | |
|---|---|---|
| 2010/0220656 A1 | 9/2010 | Ramankutty et al. |
| 2010/0302937 A1 | 12/2010 | Hu et al. |
| 2011/0176413 A1 | 7/2011 | Tanabe et al. |
| 2013/0235805 A1* | 9/2013 | Yang et al. .................. 370/328 |

FOREIGN PATENT DOCUMENTS

| | | |
|---|---|---|
| JP | 2010-45429 A | 2/2010 |
| JP | 2014516495 | 7/2014 |
| KR | 10-2011-0039349 A | 4/2011 |
| WO | 2010/016518 A | 11/2010 |

OTHER PUBLICATIONS

"Universal Mobile Telecommunications System (UMTS); LTE; Mobility Management Entity (MME) Visitor Location Register (VLR) SGs interface specification (3GPP TS 29.118 version 10.3.0 Release 10)," ETSI TS 129 118 V10.3.0, Technical Specification, European Telecommunications Standards Institute (ETSI), pp. 1-61, Apr. 2011.
Alcatel-Lucent et al., "Restoration of CS services after MME failure w/o restart," 3$^{rd}$ Generation Partnership Project (3GPP), 3GPP TSG CT4 Meeting #53, C4-111420, XP050485169, 3 pages, Tallinn, Estonia, May 9-13, 2011.
International Search Report for PCT/EP2012/057084 dated Jun. 6, 2012.
3GPP TS 29.118 V10.3.0 (Mar. 2011), Technical Specification, 3rd Generation Partnership Project; Technical Specification Group Core Network and Terminals; Mobility Management Entity (MME)—Visitor Location Register (VLR), SGs interface specification, (Release 10), 60 pages.
3GPP TS 29.118 V10.3.0 (Mar. 2011), Technical Specification, 3rd Generation Partnership Project; Technical Specification Group Core Network and Terminals; Mobility Management Entity (MME)—Visitor Location Register (VLR), SGs interface specification, (Release 10), 9 pages.
3GPP TR 23.857 V1.2.0 (Feb. 2011), Technical Report, 3rd Generation Partnership Project; Technical Specification Group Core Network and Terminals; Study of EPC Nodes Restoration, (Release 10), 31 pages.
NTT Docomo, Use of IMSI Paging in EPS and CSFB, 3GPP TSG-SA WG2#67 S2-085391, 3GPP, Aug. 1, 2008.
Huawei, Pseudo-CR on Paging reject handling in the MME, 3GPP TSG-CT WG1#56 C1-084882, 3GPP, Nov. 3, 2008.
NEC, SGs association states at the MME, 3GPP TSG-CT WG1#55bis C1-083797, 3GPP, Oct. 13, 2008.
Alcatel-Lucent, Paging signalling optimization after MME failure, 3GPP TSG-CT WG1#61 C1-093993, 3GPP, Oct. 2, 2009.
Huawei, Clarification of the Service indicator, 3GPP TSG-CT WG1#56 C1-084884, 3GPP, Nov. 3, 2008.

\* cited by examiner

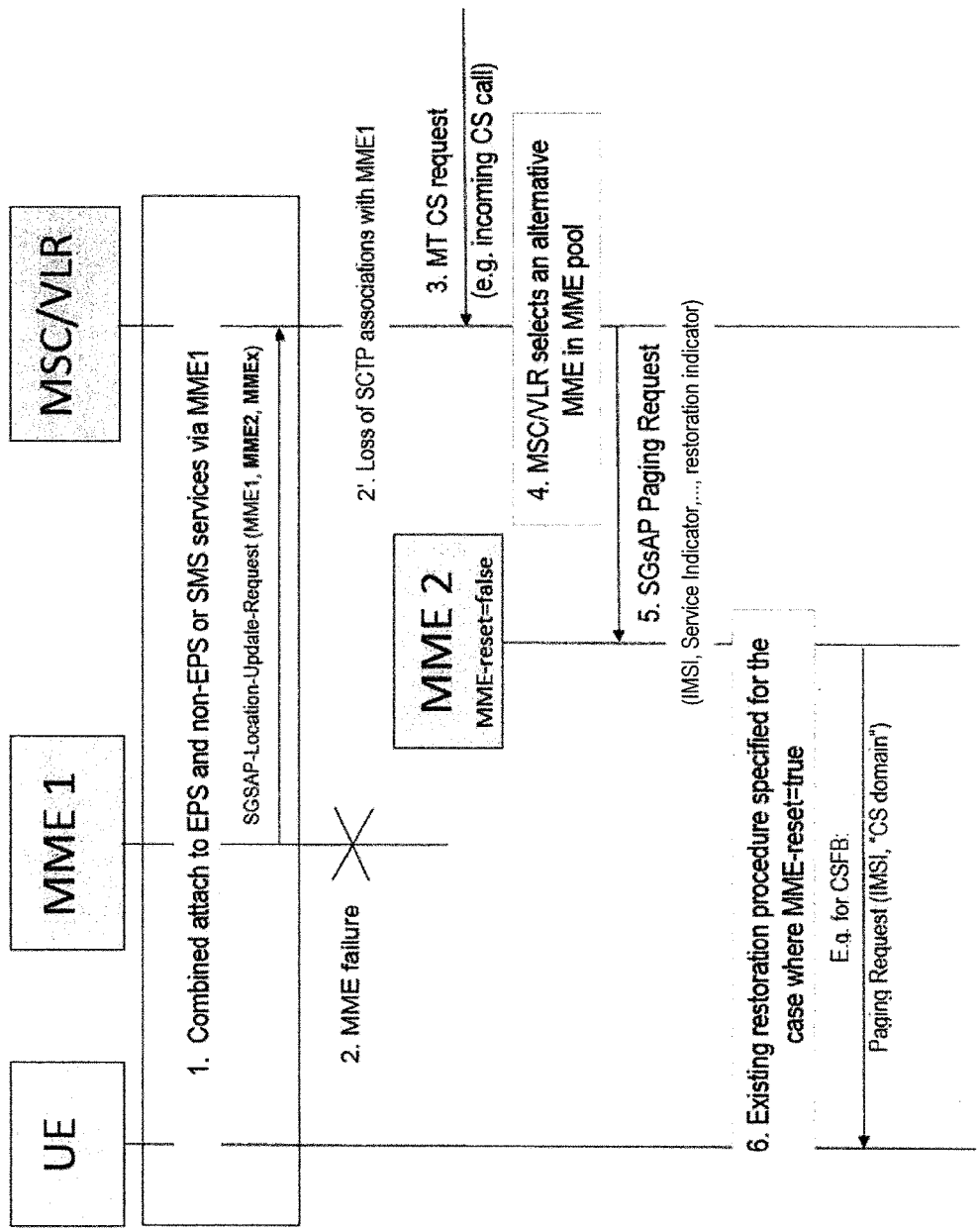
FIG. 3 – MME restoration for CS services

RESTORATION OF MOBILE TERMINATING CS SERVICES IN CASE OF FAILURE OF A CORE NETWORK ENTITY IN A MOBILE COMMUNICATION SYSTEM

FIELD OF THE INVENTION

The present invention generally relates to mobile communication networks and systems.

BACKGROUND

Detailed descriptions of mobile communication networks and systems can be found in the literature, such as in particular in Technical Specifications published by standardization bodies such as for example 3GPP (3$^{rd}$ Generation Partnership Project).

In such systems, a mobile terminal (or User Equipment UE) has access via a Radio Access Network (RAN) to a Core Network (CN) providing mobile communication services.

Examples of systems, such as for example 3GPP systems, include: 2G-GSM, 3G-UMTS, 3GLTE-EPS (Evolved Packet System).

For example, an architecture for EPS is recalled in FIG. 1 taken from 3GPP TS 23.401. EPS Core Network comprises a PS (Packet-Switched) domain called EPC (Evolved Packet Core). EPC comprises entities such as in particular MME (Mobility Management Entity) in charge of control plane functions such as in particular mobility management and paging procedure for MT (Mobile Terminating) services towards UEs in idle mode. In EPS, CS (Circuit-Switched) services (such as for example voice services or other services such as SMS (Short Message Service)) can be delivered as IP-based services, via PS domain EPC providing IP connectivity to an operator's IP network (for example IMS network).

On the contrary, in systems such as GSM or UMTS (not specifically illustrated), CS services (such as for example voice services or other services such as SMS (Short Message Service)) are delivered via CS (Circuit-Switched) domain. CS domain comprises entities such as in particular MSC/VLR or MSC Server/VLR) in charge of control plane functions such as in particular mobility management and paging procedure for MT (Mobile Terminating) services towards UEs in idle mode.

New functionalities may be introduced to allow reuse of already deployed CS infrastructures co-existing with newly deployed EPS infrastructures.

An example of such new functionalities is the functionality called CSFB (CS Fallback) and/or SMS over SGs in EPS, specified in particular in 3GPP TS 23.272. EPS architecture for CSFB and/or SMS over SGs in EPS is recalled in FIG. 2 taken from 3GPP TS 23.272.

The CSFB and/or SMS over SGs in EPS functionality uses SGs interface mechanisms between MSC/VLR (or MSC Server/VLR) in CS domain and MME in EPC supporting such functionality. SGs interface is specified in particular in 3GPP TS 29.118.

SGs is the reference point between MME and MSC/VLR (or MSC Server/VLR). The SGs reference point is used for the mobility management and paging procedures between EPS and CS domain. The SGs reference point is also used for SMS delivery.

SUMMARY

As recognized by the inventor and as will described with more detail later in the description, there is a need to improve the delivery of MT (Mobile Terminating) CS services, in particular when the CSFB and/or SMS over SGs in EPS functionality is used. More generally, there is a need to improve end-user experience, or quality of service as perceived by end-users, in such systems, such that the deployment of LTE/EPC does not impair the delivery of MT (Mobile Terminating) CS services.

Embodiments of the present invention in particular address such needs.

These and other objects are achieved, in one aspect, by a method for restoration of MT (Mobile Terminating) CS services in case of failure of a PS Core Network CN entity, referred to as original CN entity, originally identified as to be contacted for a paging request towards a User Equipment UE for said MT CS services, in a mobile communication system.

In an embodiment, said method comprises:
providing that an alternative CN entity is contacted instead of said original CN entity, and that said alternative CN entity is forced to accept said paging request even if said UE is unknown to said alternative CN entity.

These and other objects are achieved, in other aspects, by CN entities configured for performing such restoration of MT (Mobile Terminating) CS services, such as in particular MME and MSC/VLR (or MSC Server/VLR) supporting the CSFB and/or SMS over SGs in EPS functionality.

DESCRIPTION OF THE DRAWINGS

Some embodiments of apparatus and/or methods in accordance with embodiments of the present invention are now described, by way of example only, and with reference to the accompanying drawings, in which:

FIG. 3 is intended to illustrate an example of a method according to an embodiment of the present invention, for example in a system supporting CS fallback and/or SMS over SGs in EPS.

DETAILED DESCRIPTION

Figure 1:
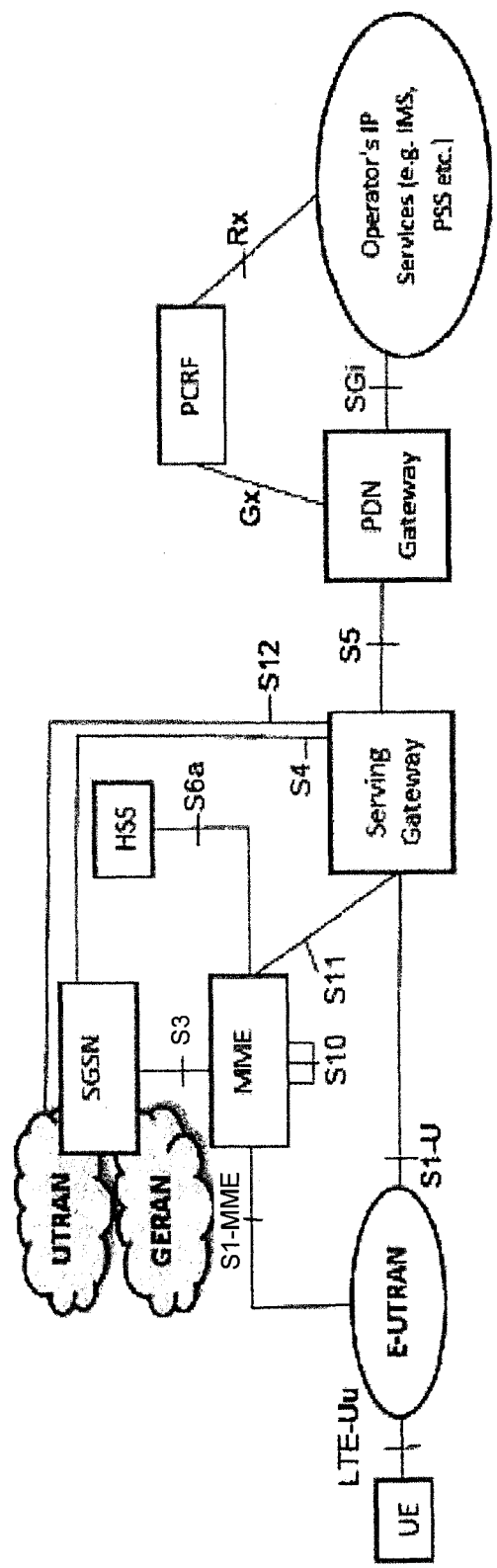
FIG. 1 is intended to recall an example of EPS architecture.
Figure 2:
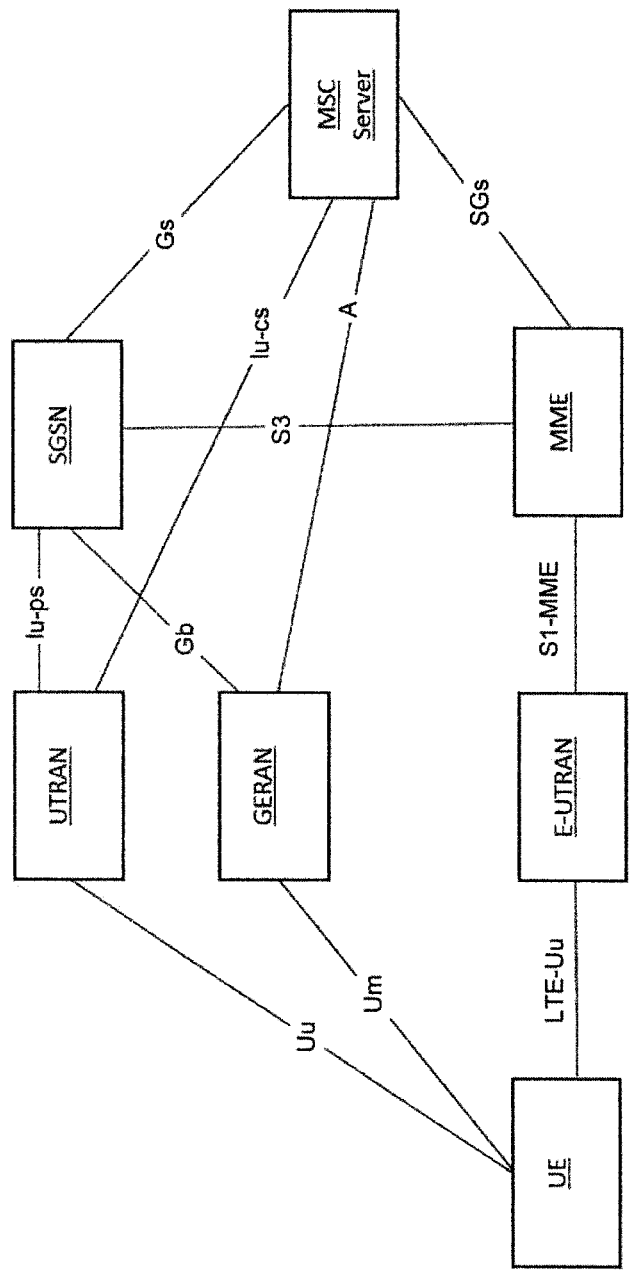
FIG. 2 is intended to recall an example of architecture for CS fallback and/or SMS over SGs in EPS.

In the following, embodiments of the present invention will more particularly be described, by way of example, for the case of a system supporting the CSFB and/or SMS over SGs in EPS functionality. However, the present invention is not limited to such case.

With the deployment of LTE in mobile networks, there is the risk that mobile terminated CS services (e.g. CS calls, SMS, Mobile termination Location request) can not be successfully delivered to the subscriber for a long period (up to the periodic Tracking Area Update timer e.g. 1 hour) after an MME failure without restart or a long MME failure. In comparison, CS terminated services can be delivered without any delay prior to the introduction of LTE.

A UE under LTE that requires support of CS or/and SMS services performs a combined attach procedure to attach for both EPS and non-EPS services (i.e. CS services), or both EPS services and "SMS only" services, and a combined tracking area update procedure to update the registration of the actual tracking area (see 3GPP TS 23.401 and TS 24.301). During those procedures, the serving MME initiates a location update for non-EPS services procedure towards the MSC providing the CS or/and SMS services, thereby establishing an SGs association between the MME and MSC (see 3GPP TS 23.272 and TS 29.118). Upon receipt of a subsequent CS terminated service (e.g. MT CS call or SMS), the MSC sends an SGs Paging Request message to the serving MME with a "CS call indicator" or an "SMS indicator" which triggers a CS Fallback procedure or SMS transfer via LTE (see 3GPP TS 23.272 and TS 29.118).

Restoration procedures are defined in 3GPP TS 29.118 (see in particular clause 5.1.3) to maintain mobile terminated CS services (e.g. CS call or SMS) when an MME fails but restarts. They essentially rely on the principle that MME accepts SGs-paging request received for unknown UEs for a certain period after the MME restart whose duration typically covers the largest tracking area update timer assigned to UEs. During that period, the MME sets a system-wide parameter MME-reset to true. After that period, the MME sets the MME-reset parameter to false and stops accepting SGs paging request for unknown UEs.

But if the MME fails without restart, or if the MME fails for a long duration, it is no longer possible for the MSC to page the UE via the MME. Since UEs in idle mode are not aware of the MME failure until they need to send some uplink data or signaling (e.g. periodic Tracking Area Update), they remain under LTE but can not receive any more mobile terminated services.

Embodiments of the present invention in particular enable to solve such problem or avoid such drawbacks.

Embodiments of the present invention provide that the network continues to deliver CS services to UEs via an alternative MME in the MME pool where the UE is located. It is recalled that an MME pool comprises several MMEs serving a same area called pool area.

In an embodiment, following steps may be provided:

1. During normal operations, the (original) MME may signal to the MSC/VLR(s) the identities of alternative MME(s) within the MME pool. Alternatively, the MSC/VLR may be pre-configured with the set of MME identities pertaining to the same MME pool.

2. Upon receipt of mobile terminated services (e.g. CS call), the MSC/VLR may select one of these alternative MMEs if it detects that the (original) MME serving the UE is no longer in service (e.g. by detecting that there is no more SCTP associations in service with that (original) MME), and may send a SGs paging request to this (single) alternative MME with a new 'restoration indicator' parameter in the message to force the receiving (alternative) MME to accept the SGs paging request and to proceed with the CSFB or SMS procedure even if the UE (i.e. IMSI) is unknown to this MME and even if the MME has not restarted recently (i.e. even in the 'MME-reset=false' state).

3. Upon receipt of such a request including the new 'restoration indicator' flag, the (alternative) MME may proceed with the existing restoration procedure specified in 3GPP TS 29.118 clause 5.1.3 for the case where the MME has restarted recently (i.e. for the case where MME-reset=true).

Note: without the above-mentioned new 'restoration indicator' flag, MMEs would reject SGs paging request (as per existing specification) for unknown UEs to avoid that multiple MMEs page the UE if the VLR broadcasts the SGs paging request to multiple MMEs after an MSC/VLR restart.

In other embodiments, following steps may be provided, for example as illustrated in FIG. 3.

During normal operations, the (original) MME, noted MME 1, signals to the MSC/VLR with which it has SGs association(s) the identities of alternative MME(s) within the MME pool (such as MME2, MMEx as illustrated). The (original) MME may e.g. send those MMEs identities under the form of additional MME names sent in existing SGs signaling message, e.g. in the SGsAP Location Update Request (as illustrated at step 1) or SGsAP Reset Indication message. Alternatively, the MSC/VLR may be pre-configured with the set of MME identities pertaining to the same MME pool.

As specified in TS 29.118 clause 6, SCTP (see IETF RFC 4960) is defined as the transport layer of SGsAP messages. Semi-permanent SCTP associations shall be established between the MME and VLR, i.e. the SCTP associations shall remain up under normal circumstances. The MME shall establish the SCTP association. Transport network redundancy may be achieved by SCTP multi-homing between two end-points, of which one or both is assigned with multiple IP addresses. MME and VLR shall support a configuration with a single SCTP association per MME/VLR pair. Configurations with multiple SCTP endpoints per MME/VLR pair may be supported.

If the original MME fails (as illustrated at step 2), the MSC/VLR may detect such failure, e.g. by detecting that there is no more SCTP associations in service with the (original) MME, as illustrated at step 2'.

Upon receipt of mobile terminated services (e.g. CS call) as illustrated at step 3, if the MSC/VLR detects a failure of the (original) MME (i.e. MME via which the UE was registered to non EPS or SMS services), the MSC/VLR may, as illustrated at step 4, select one alternative MME (noted MME 2) among the list of MMEs previously received from the failed MME, and may, as illustrated at step 5, send an SGs paging request to this (single) alternative MME (via one of the SCTP associations in service with that MME), including a new 'restoration indicator' parameter in the message.

The receiving MME (alternative) may, as illustrated at step 6, process an SGsAP Paging Request with the new 'restoration indicator' flag set, like specified today in TS 29.118 clause 5.1.3 for the case where it has restarted recently, but regardless of its own 'MME reset' value, i.e. as follows:

If the Service indicator information element in the SGsAP-PAGING-REQUEST message indicates "CS call indicator", the MME shall handle the paging request as follows:

c) If the UE is not known and regardless of the "MME-Reset" restoration indicator at the MME, the MME shall handle the paging request as follows:

if the MME only supports "SMS only", the MME shall return an SGsAP-PAGING-REJECT message to the VLR indicating in the SGs cause information element "Mobile terminating CS fallback call rejected by the user";

if the SGsAP-PAGING-REQUEST message includes the Location area identifier information element, the MME shall page the UE in all the tracking areas served by the MME that can be mapped to the location area indicated in the Location area identifier information element; or if the SGsAP-PAGING-REQUEST message does not include the Location area identifier information element, the MME may page in all the tracking areas served by the MME, or the tracking areas served by the MME and by the VLR.

If the Service indicator information element in the SGsAP-PAGING-REQUEST message indicates "SMS indicator", the MME shall handle the paging request as follows:

c) If the UE is not known and regardless of the "MME-Reset" restoration indicator at the MME, the MME shall handle the paging request as follows:

if the SGsAP-PAGING-REQUEST message includes the Location area identifier information element, the MME shall page the UE in all the tracking areas served by the MME that can be mapped to the location area indicated in the Location area identifier information element; or if the SGsAP-PAGING-REQUEST message does not include the Location area identifier information element, the MME may page in all the tracking areas served by the MME, or the tracking areas served by the MME and by the VLR.

The paging procedure initiated by the MME for CS Fallback to A/Gb or Iu mode is further specified in 3GPP TS 24.301 clause 5.6.2.3. The paging message includes a UE Paging Identity set to the UE's IMSI (or UE's S-TMSI if that identity has been stored in non-volatile memory) and a CN domain indicator set to "CS" in order to indicate that this is paging for CS fallback. The MME may then follow CS Fallback call flows specified in 3GPP TS 23.272 e.g. clause 6.6 or 7.4. To be noted that the restarted or alternative MME won't be able to integrity protect NAS signaling sent to the UE but that the EMM entity in the UEs shall accept a SERVICE REJECT (with an EMM cause other than #25) without integrity protection (see 3GPP TS 24.301 clause 4.4.4.2) typically for those kinds of network restoration scenarios.

For SMS over SGs, the receiving MME may either:

follow the paging procedure for SMS (3GPP TS 24.301, clause 5.6.2.4) if the MME can retrieve the S-TMSI and security parameters (required to protect the NAS signaling for SMS transfer over LTE), e.g. if such parameters are stored in non-volatile memory; or page the UE with IMSI (and CN domain indicator set to "PS") to force UEs (in idle mode) to re-attach to EPC. This would lead the UE to re-attach to any MME in the pool (not necessarily the same MME), which would lead to restore an SGs association between likely (but not necessarily either) the same MSC and the new MME. From that point in time, subsequent SMS will succeed. The on-going SMS transfer will fail (paging timer will expire in the original MSC), but the existing SMS procedures (SMS alert) allows to resume the SMS transfer after the new combined attach procedure.

In one aspect, there is provided a method for restoration of MT (Mobile Terminating) CS services in case of failure of a PS Core Network CN entity, referred to as original CN entity, originally identified as to be contacted for a paging request towards a User Equipment UE for said MT CS services, in a mobile communication system.

Various embodiments are provided, which can be used alone or in combination (according to various combinations).

In an embodiment, said method comprises:
providing that an alternative CN entity is contacted instead of said original CN entity, and that said alternative CN entity is forced to accept said paging request even if said UE is unknown to said alternative CN entity.

In an embodiment, said method comprises:
providing that said alternative CN entity is forced to perform a restoration procedure as if the alternative CN entity were restarting after a failure, even if the alternative CN entity is not restarting after a failure.

In an embodiment, said original and alternative CN entity belong to a pool of CN entities serving a same area.

In another aspect, there is provided a method for restoration in case of failure of a Mobility Management Entity MME in Evolved Packet System EPS, referred to as original MME, originally identified by a MSC/VLR in CS domain having an SGs association with said original MME for an UE, as to be contacted for a paging request for MT CS services delivery to said UE, in a system supporting CS Fallback and/or SMS over SGs in EPS.

Various embodiments are provided, which can be used alone or in combination (according to various combinations).

In an embodiment, said method comprises:
providing that an alternative MME is contacted instead of said original MME, and that said alternative MME if forced to accept said paging request even if said UE is unknown to said alternative MME.

In an embodiment, said method comprises:
providing that said alternative MME is forced to handle said paging request as if the MME-Reset parameter at the alternative MME were set to true, even if the MME-Reset parameter at the alternative MME is set to false.

In an embodiment, said method comprises:
during normal operation, the original MME signalling to the MSC/VLR identity information of at least one alternative MME.

In an embodiment, said method comprises:
during normal operation, the original MME signalling to the MSC/VLR, in an SGSAP-Location-Update-Request, identity information of at least one alternative MME.

In an embodiment, said method comprises:
during normal operation, the original MME signalling to the MSC/VLR, in an SGSAP-Reset-Indication message, identity information of at least one alternative MME.

In an embodiment, said method comprises:
pre-configuring the MSC/VLR with identity information of at least one alternative MME.

In an embodiment, said method comprises:
the MSC/VLR detecting a failure of the original MME by detecting that there is no more SCTP association in service with that MME.

In an embodiment, said method comprises:
upon reception of a request for MT CS services delivery to said UE, in case of failure of the original MME, the MSC/VLR selecting an alternative MME and sending an SGSAP Paging Request to the selected alternative MME.

In an embodiment, said method comprises:
upon reception of a request for MT CS services delivery to said UE, in case of failure of the original MME, the MSC/VLR selecting an alternative MME and sending an SGSAP-Paging-Request to the selected alternative MME, said SGSAP-Paging-Request containing a restoration indicator flag forcing the alternative MME to accept said Paging Request.

In an embodiment, said method comprises:
upon reception of an SGSAP-Paging-Request containing a restoration indicator flag forcing the alternative MME to accept said Paging Request, the alternative MME handling said Paging Request as if the MME-Reset parameter at the alternative MME were set to true, even if the MME-Reset parameter at the alternative MME is set to false.

In an embodiment, said method comprises:
upon reception of an SGSAP-Paging-Request containing a restoration indicator flag forcing the alternative MME to accept said Paging Request, the alternative MME handling the paging request such that, regardless of the state of the MME-Reset parameter at the alternative MME:
if the SGsAP-Paging-Request message includes a Location Area Identifier information element, the MME pages the UE in all the Tracking Areas served by the MME that can be mapped to the Location Area indicated in the Location Area Identifier information element; or
if the SGsAP-Paging-Request message does not include the Location Area Identifier information element, the MME may page in all the Tracking Areas served by the MME, or the Tracking Areas served by the MME and by the VLR.

Other aspects relate to CN entities configured for performing such restoration of MT (Mobile Terminating) CS services, such as in particular MME and MSC/VLR (or MSC Server/VLR) supporting the CSFB and/or SMS over SGs in EPS functionality.

In an embodiment, there is provided a Core Network entity for a mobile communication system, configured for performing such restoration of MT (Mobile Terminating) CS services.

In an embodiment, there is provided a Mobility Management Entity MME supporting CS Fallback and/or SMS over SGs in EPS, configured for performing such restoration of MT (Mobile Terminating) CS services.

In an embodiment, said MME, acting as an original MME, is configured for:
during normal operation, signalling to the MSC/VLR identity information of at least one alternative MME.

In an embodiment, said MME, acting as an original MME, is configured for:
during normal operation, signalling to the MSC/VLR, in an SGSAP-Location-Update-Request, identity information of at least one alternative MME.

In an embodiment, said MME, acting as an original MME, is configured for:
during normal operation, signalling to the MSC/VLR, in an SGSAP-Reset-Indication message, identity information of at least one alternative MME.

In an embodiment, said MME, acting as an alternative MME, is configured for:
upon reception of an SGSAP-Paging-Request containing a restoration indicator flag forcing the alternative MME to accept said Paging Request, handling said Paging Request as if the MME-Reset parameter at the alternative MME were set to true, even if the MME-Reset parameter at the alternative MME is set to false.

In an embodiment, said MME, acting as an alternative MME, is configured for:
upon reception of an SGSAP-Paging-Request containing a restoration indicator flag forcing the alternative MME to accept said Paging Request, handling the paging request such that, regardless of the state of the MME-Reset parameter at the alternative MME:
if the SGsAP-Paging-Request message includes a Location Area Identifier information element, the MME pages the UE in all the Tracking Areas served by the MME that can be mapped to the Location Area indicated in the Location Area Identifier information element; or
if the SGsAP-Paging-Request message does not include the Location Area Identifier information element, the MME may page in all the Tracking Areas served by the MME, or the Tracking Areas served by the MME and by the VLR.

In an embodiment, there is provided a MSC/VLR or MSC Server/VLR supporting CS Fallback and/or SMS over SGs in EPS, configured for performing such restoration of MT (Mobile Terminating) CS services.

In an embodiment, said MSC/VLR or MSC Server/VLR is configured for:
pre-configuring said MSC/VLR with identity information of at least one alternative MME.

In an embodiment, said MSC/VLR or MSC Server/VLR is configured for:
detecting a failure of the original MME by detecting that there is no more SCTP association in service with that MME.

In an embodiment, said MSC/VLR or MSC Server/VLR is configured for:
upon reception of a request for MT CS services delivery to said UE, in case of failure of the original MME, selecting an alternative MME and sending an SGSAP Paging Request to the selected alternative MME.

In an embodiment, said MSC/VLR or MSC Server/VLR is configured for:
upon reception of a request for MT CS services delivery to said UE, in case of failure of the original MME, selecting an alternative MME and sending an SGSAP-Paging-Request to the selected alternative MME, said SGSAP-Paging-Request containing a restoration indicator flag forcing the alternative MME to accept said Paging Request.

The detailed implementation of the above-mentioned entities does not raise any special problem for a person skilled in the art, and therefore such entities do not need to be more fully disclosed than has been made above, for a person skilled in the art.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:
1. An apparatus comprising:
at least one processor; and
at least one memory including computer program code;
the at least one memory and the computer program code configured to, with the at least one processor, cause the apparatus at least to perform:
detecting that a mobility management entity serving a user equipment is no longer in service, and
sending, to one alternative mobility management entity, an SGs paging request with a restoration indicator to cause said alternative mobility management entity to accept and handle said SGs paging request regardless of the value of a mobility management entity-reset parameter, including a value of mobility management entity-reset parameter set to false, in the alternative mobility management entity if an international mobile subscriber identity associated to the user equipment is unknown to the alternative mobility management entity.

2. The apparatus according to claim 1, wherein the at least one memory and the computer program code are further configured to, with the at least one processor, cause the apparatus to perform:
selecting said alternative mobility management entity out of mobility management entities pertaining to a same mobility management entity pool.

3. The apparatus according to claim 1, wherein the at least one memory and the computer program code are further configured to, with the at least one processor, cause the apparatus to perform:
detecting that a mobility management entity is no longer in service by detecting that there are no more stream control transmission protocol associations in service with said mobility management entity.

4. A VLR The apparatus according to claim 1,
wherein the apparatus is pre-configured with a set of mobility management entity identities pertaining to a same mobility management entity pool.

5. The apparatus according to claim 1, wherein the at least one memory and the computer program code are further configured to, with the at least one processor, cause the apparatus to perform:
receiving SGs messages including identities of alternative mobility management entities within a mobility management entity pool, said SGs messages including SGs application part location update request or SGs application part reset indication message.

6. The apparatus according to claim 1, wherein said SGs paging request includes a service indicator information element indicating a circuit switched call indicator or short message service indicator.

7. The apparatus according to claim 1, the at least one memory and the computer program code are further configured to, with the at least one processor, cause the apparatus to perform:
selecting said alternative mobility management entity out of mobility management entities pertaining to a same mobility management entity pool, wherein the same mobility management entity pool comprises mobility management entities serving a same area.

8. A visitor location register comprising the apparatus according to claim 1.

9. An apparatus comprising:
at least one processor; and
at least one memory including computer program code;
the at least one memory and the computer program code configured to, with the at least one processor, cause the apparatus at least to perform:
determining if a SGs paging request is received with a restoration indicator for a mobile terminated circuit switched service for a user equipment; and
if said SGs paging request is received with said restoration indicator, accept and handle said SGs paging request regardless of the value of a mobility management entity-reset parameter in the mobility management entity, including a value of mobility management entity-reset parameter set to false, if an international mobile subscriber identity associated to the user equipment is unknown to the mobility management entity.

10. The apparatus according to claim 9, wherein the at least one memory and the computer program code are further configured to, with the at least one processor, cause the apparatus to perform:
handling said SGs paging request dependent on at least one of:
a service indicator in said SGs paging request, and
an location area identifier in said SGs paging request.

11. A mobility management entity comprising the apparatus according to claim 9.

12. A method, performed by one or more processors of a visitor location register, to generate a SG paging request for paging a user equipment for a mobile terminated circuit switched service, the method comprising:
detecting that a mobility management entity serving said user equipment is no longer in service, and
sending, to one alternative mobility management entity, an SGs paging request with a restoration indicator to cause said alternative mobility management entity to accept and handle said SGs paging request regardless of the value of a mobility management entity-reset parameter, including a value of mobility management entity-reset parameter set to false, in the alternative mobility management entity in response to an international mobile subscriber identity associated to the user equipment being unknown to the alternative mobility management entity.

13. The method according to claim 12, wherein:
the SGs paging request includes a service indicator indicating circuit switched call indicator or short message service indicator.

14. The method according to claim 12, the method further comprising:
selecting said alternative mobility management entity out of mobility management entities pertaining to a same mobility management entity pool.

15. A method according to claim 12, the method further comprising:
selecting said alternative mobility management entity out of mobility management entities pertaining to a same mobility management entity pool, wherein the same mobility management entity pool comprises mobility management entities serving a same area.

16. A method, performed by one or more processors of a mobility management entity, to receive a SG paging request, the method comprising:
determining if a SGs paging request is received with a restoration indicator for a mobile terminated circuit switched service for a user equipment; and
in response to receiving the SGs paging request with said restoration indicator, accepting and handling said SGs paging request regardless of the value of a mobility management entity-reset parameter, including a value of mobility management entity-reset parameter set to false, in the mobility management entity in response to an international mobile subscriber identity associated to the user equipment being unknown to the mobility management entity.

17. The method according to claim 16, the method further comprising:
handling said SGs paging request dependent on at least one of:
a service indicator in said SGs paging request, and
an location area identifier in said SGs paging request.

* * * * *